Figure 1:
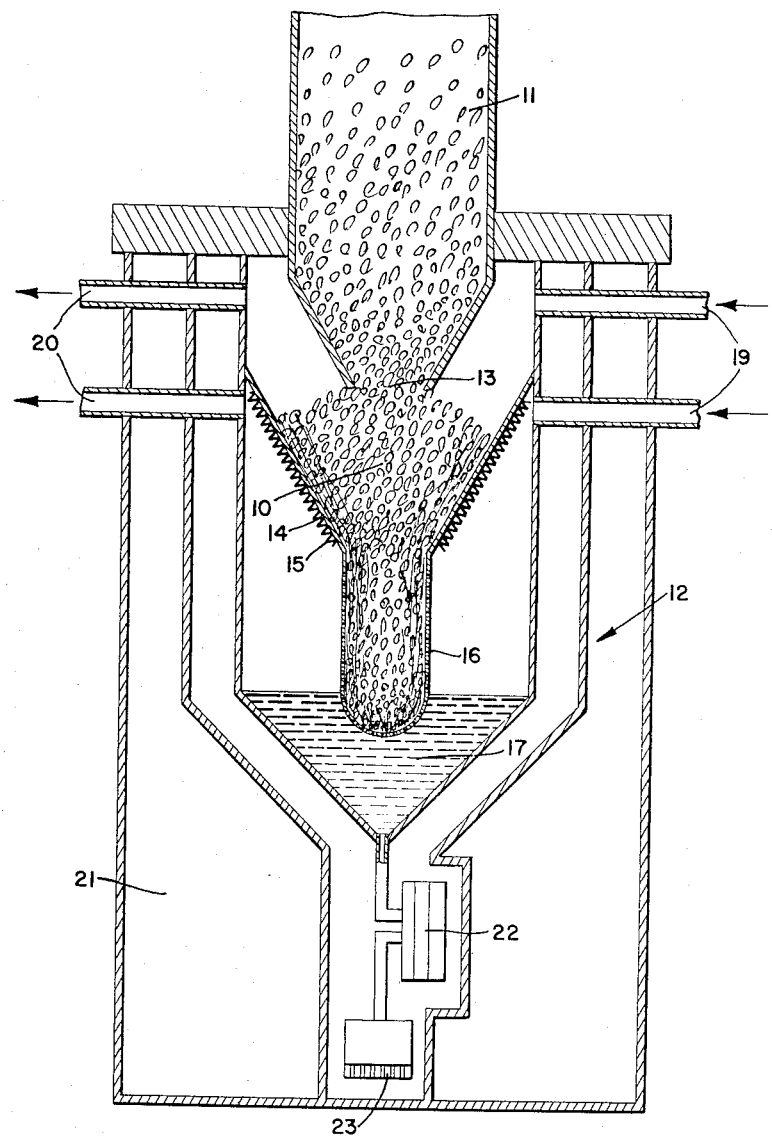

March 17, 1959  H. WEGENER ET AL  2,877,495
PROCESS AND APPARATUS FOR MELT SPINNING
Filed July 29, 1952  2 Sheets-Sheet 1

INVENTORS
HARRY WEGENER,
GAETANO BRUNI,
LUIGI NOTARBARTOLO,
WERNER MUENCH

March 17, 1959 H. WEGENER ET AL 2,877,495
PROCESS AND APPARATUS FOR MELT SPINNING
Filed July 29, 1952 2 Sheets-Sheet 2

INVENTORS
HARRY WEGENER,
GAETANO BRUNI,
LUIGI NOTARBARTOLO,
WERNER MUENCH.

ATTORNEYS

United States Patent Office 2,877,495
Patented Mar. 17, 1959

2,877,495
PROCESS AND APPARATUS FOR MELT SPINNING

Harry Wegener, Chur, Switzerland, and Gaetano Bruni and Luigi Notarbartolo, Milan, and Werner Muench, Cesano Maderno, Italy, assignors to Perfogit Società per Azioni, Milan, Italy Application July 29, 1952, Serial No. 301,498

Claims priority, application Italy August 4, 1951

10 Claims. (Cl. 18—8)

This invention relates to a melting process and apparatus to be used for the spinning of substances that are spun by melting them and then extruding them through suitably-shaped orifices. It is understood that, according to the shape of said orifices, the final products obtained may be different from filaments or threads, and may be for instance ribbons, rods, sheets and the like.

This invention is applicable to all melt-spinnable substances, but is particularly useful in the spinning of macromolecular synthetic products obtained by polycondensation or polymerization (often briefly called "high polymers").

It has already been attempted to melt such substances, in particular polyamides, by leading the solid substance into a bath of the same substance in the molten state, kept at a high enough temperature. This method however has proved unsuitable for large scale operation and has not received any industrial application to date.

The system employed instead is to melt by contact with a solid headed surface: but it too has considerable drawbacks, well known to those skilled in the art, such as for instance that a high melting rate requires very large melting surfaces, that gases or vapors often develop in the molten polymer or are occluded by it, and that the polymer often becomes overheated, causing a deterioration of the product's quality etc.

According to this invention, the melting of melt-spinnable substances, in particular high polymers, is brought about in a specially efficient and convenient manner through a new and original combination of the principles of melting by contact with solids and melting by contact with liquids (but not in general in a liquid bath), combination that makes it possible to retain the desirable features of both methods while substantially eliminating their drawbacks and obtaining a new and useful industrial result. That such a combination of the two aforesaid principles should be practically possible and that it should lead to such advantageous results, was not to be foreseen and is indeed surprising; however our experience has proved that the phenomena and results hereinafter set forth actually occur and are achieved.

According to this invention, then, the melting of the desired substance, that will always be called, for the sake of brevity, both in the specification and the claims, "polymer," takes place in two stages: a first stage that may be called "first melting" wherein a first portion of the polymer melts by contact with a heating surface generally having a simple configuration; and a second stage that may be called "further melting" wherein said portion of liquid polymer originating from the first melting, to which there may be added other liquid drawn from a collecting space, comes into contact with the solid polymer and causes a further portion thereof to melt while said liquid cools; and all the polymer melted in both stages, in a thermally balanced condition, gathers in said collecting space or "sump" from which it is later delivered to the spinnerets by any suitable means that are not a part of this invention, said molten mass cooperating in certain cases to the melting of the solid polymer in the aforementioned second melting stage.

Generally, the first melting also contributes to render the feed of solid polymer regular and to start the operation of the apparatus. Further, it can be so controlled, as will be made clear in the course of the description, as to increase or decrease the overall melting rate in the apparatus, while no particular control of the solid polymer stock feed is required.

In a particular form of the invention, the melting solid polymer is used as a means for a partial decantation and filtration of the liquid, whereby one obtains in the sump a liquid that is already considerably homogeneous and does not require, or requires only to a reduced extent, the treatments which the liquid polymer must undergo in the solid melting surface devices hitherto known. In another particularly simple form, the movement of the liquid polymer occurs entirely by gravity. In still another form, the motion of the molten polymer is obtained through means that are in part different from gravity, and the liquid mass contained in the collecting sump participates in said motion and thereby cooperates more effectively to the melting.

In a further form of the invention, the motion is partly a fall by gravity and partly a circulation, and precisely: the liquid from the first melting falls and that from the sump circulates. In this case there are more means available for regulating the operation of the device, since the delivery and the temperature of the circulating fluid are added variables that can be controlled.

The advantages and characteristics of the invention will be better understood from the following description of two embodiments thereof, it being understood that the invention is not limited to what will be described but encompasses all the modifications that persons skilled in the art may effect therein by applying with proper technical criteria the invention's principles.

Figure 2:
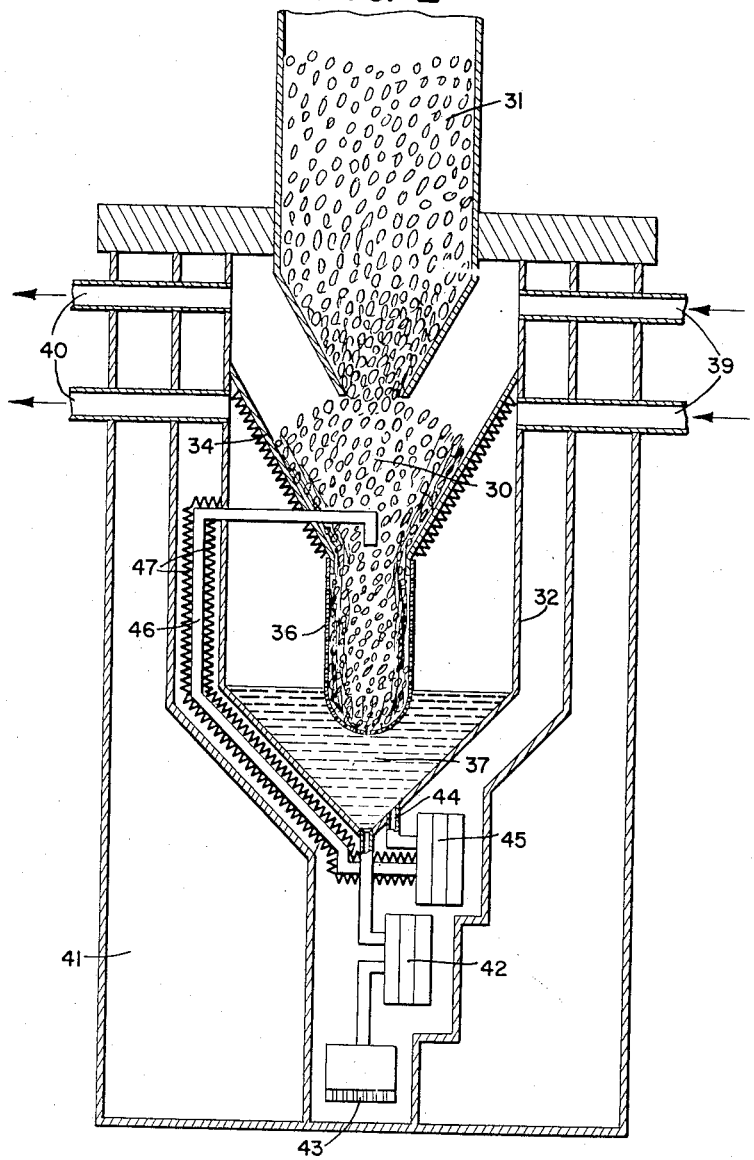

In the appended drawings, Fig. 1 illustrates in diagrammatical vertical cross section one embodiment of the invention, and Fig. 2 similarly illustrates a second embodiment of the invention.

With reference to Fig. 1, 10 indicates the solid polymer which, in the example illustrated, is subdivided into particles of suitable sizes, for instance granules, chips or the like. The solid polymer is fed from a reservoir 11 partially and schematically indicated in the drawing which may be provided with heating means, not shown inasmuch as they are not a part of the invention, adapted to preheat the polymer.

From reservoir 11 the solid polymer reaches the melting apparatus globally indicated at 12. One may provide a measuring device to control the passage of the solid polymer from reservoir 11 to apparatus 12, but in general this is not necessary and since it is preferable to avoid moving parts, no measuring device has been shown in the drawing and the feed of solid polymer is automatically determined by the area of the mouth 13 of the reservoir and by the level of the polymer in the apparatus 12 and therefore the feed is always in proportion to the production. The apparatus 12 comprises in its upper portion the organs for the melting of the first part of the polymer, said organs preferably having the simplest possible form, such as, in the case shown, the shape of a funnel 14 that is heated by means of resistances 15 or any other suitable means.

In these conditions the particles of solid polymer that come into contact with the funnel 14, melt and the resulting liquid flows down along the walls of the funnel and penetrates into the lower part of apparatus 12. On the contrary, the central mass of solid polymer does not melt and descends by gravity concurrently with the liquid. The presence of this latter, as has been observed, facilitates in general the descent of the solid, so that the feed of the lower portion of the apparatus is regular and uniform. This fact, proved by experience, was not to be foreseen: on the contrary, the experts in this field have always hitherto believed that in such conditions the solid material would form a bridge and practically interrupt the feed of the apparatus.

The solid polymer leaves the funnel 14 and falls into a non-heated basket 16 which may have any suitable shape and the walls of which have therein holes the size of which is determined by the practical requirements of every individual case, but which must be such as to contain the solid while allowing the liquid to dribble down.

The liquid that has flown down along the surface of funnel 14, also penetrates into basket 16 and descends therein washing the solid polymer, seeping between the particles of the solid it washes. It is clear that in these conditions the liquid will cede some heat to the solid, thus cooling itself while a portion of the solid melts. That is, in this zone of the apparatus there will take place an application of the principle of solid-liquid contact melting, an application however that is radically different from those proposed and attempted hitherto inasmuch as the solid lies still and the liquid is in motion and further the solid-liquid contact is extremely intimate as if the second washed—so to speak—the first: this in the absence of any moving organ. It is obvious that the melting occurs here inside the polymer mass and not on the walls of the basket which acts not as a melting surface but merely as a container.

In practice it has been found that the phenomenon is more complex than could be expected. Actually, the comminuted solid polymer stock, besides partly melting as hereinbefore set forth, acts somewhat like a filtering bed, causing many gas bubbles and foamy polymer fractions to remain in the basket and not to follow the liquid that dribbles down therefrom to gather in the sum 17. This phenomenon is facilitated and enhanced by a partial decantation which is believed to take place because of the slowness of the liquid's motion, due to its great viscosity, its low head, and the tortuosity of its path. We do not propose to give a detailed and precise explanation of the phenomena that take place, because the invention exists independently of the accuracy of any explanation and its advantages are proved by experience: it suffices to state that in fact the liquid polymer gathered in the sump 17 is considerably homogeneous, substantially free from gases and suitable for spinning. In the whole of the apparatus 12 an inert gas is generally circulated, for instance through suitable openings such as 19—20, so that the melting occurs entirely in the absence of oxygen. The whole apparatus is maintained at the desired temperature, or better, its several parts are maintained at the desired temperatures, by any suitable means. The fluid circulation jacket 21 schematically shown in the drawing, is a particularly simple means to that end. From sump 17 the liquid goes to spinning organs of any known type, of which a pump 22 and a spinneret 23 have been shown, but which anyway are no part of the invention.

Filters or like organs for holding back solid particles or impurities that may be present for any reason in the sump 17, may be provided.

The operation of the apparatus is evident. Initially the sump 17 will be empty, but the apparatus is self-starting as the polymer begins to melt on the funnel 14. As more liquid is produced, the sump fills up; in this initial stage, the spinning pumps do not draw any liquid, and this condition prevails until a predetermined level has been reached in the sump. In general said level is such, as shown in the drawing, that part of the basket 16 and of the solid polymer are immersed in the liquid. It is clear that in these conditions the liquid polymer coming from funnel 14 does not wash this part of the solid, which on the contrary is in contact with practically motionless liquid polymer from which it receives a certain amount of heat. Said amount however is less than that which would be ceded by the polymer flowing down from funnel 14, all other things being equal, both because this latter is in motion and because it is generally hotter than the liquid in the sump. Therefore, if the apparatus is regulated for a certain production, and the consumption becomes lower, the level in the sump will rise, the amount of solid polymer that is immersed will increase and consequently the rate of melting will decrease: the apparatus, that is, will adjust itself to the decreased consumption. As a consequence however, if the temperature of the surface that effects the first melting remains constant, the temperature of the liquid in the sump will increase because of the addition of liquid that has cooled less than it would have done under normal operating conditions, but this can be obviated in general by a thermostatic temperature control of the apparatus, whereby in these conditions this latter will receive less heat from the other external sources. Even in this case therefore the temperature oscillations may be maintained within tolerable limits.

All that has been said hold true insofar as the liquid in the sump is supposed to be motionless. If it should be desired to set it into motion to increase the heat exchanges between it and the solid, conditions would change in a way readily understood by technicians. In general however the temperature of the liquid in the sump is not determined by the temperature of the first-melting surfaces, inasmuch as the liquid produced by the first melting cools while melting a further portion of solid. The solid-liquid heat exchange creates a thermal balance that dampens all temperature oscillations, this being a feature of the present invention not to be found in processes or apparatus hitherto known.

The factors that influence the thermal balance of the apparatus are substantially: the temperature of the first-melting surfaces, the ratio between the amount of polymer melted by contact with the liquid and the amount of polymer originating from the first melting and the amount of heat imparted to the apparatus by the thermostatizing organs, that is by the sources of heat distinct from the first-melting surfaces. Not taking into account this last factor, one may say that a same temperature of the liquid in the sump may be obtained by melting a greater or a smaller percentage of the polymer on the first-melting surfaces and respectively imparting thereto a lower or higher temperature, which may be brought about also through the use of auxiliary heating surfaces that raise the temperature of the first-melting polymer when this is already in the liquid state. When a greater production is desired, that temperature can for instance be increased; then a greater amount of polymer will melt in the basket 16, that is to say: the ratio between the first-melting polymer and that melted in the basket will decrease (even if the absolute amount of the first should increase to a certain extent) with the consequence that the first-melting polymer will cool to a greater extent and, in spite of its higher initial temperature, will reach the sump substantially at the same temperature at which it previously reached said pump. One may thus act on the temperature of the first-melting polymer and thus indirectly on the ratio between said polymer and that melted by contact with the liquid, in order to regulate the production of the apparatus. Of course it would also be possible, though less easy, to act on the extension of the first-melting surfaces and of the auxiliary surfaces, if any: and one may act on the preheating, if it exists.

These considerations set forth the elasticity of operation and the automatic compensation phenomena that are characteristic advantages afforded by this invention. All temperature controls can be rendered conveniently automatic.

In the embodiment of Fig. 2, numeral 30 designates the solid polymer fed from a reservoir 31 where it may, if desired, be preheated.

The melting apparatus is globally indicated with the numeral 32 and comprises organs that are analogous to those of Fig. 1: melting surfaces 34, in particular funnel-shaped (to which there can be associated convenient auxiliary heating surfaces, not shown); basket 36 in which the further melting occurs; sump 37; openings 39, 40 for the circulation of an inert gas; pump 42; spinneret 43; and the thermostatizing means schematically represented by the fluid circulation jacket 41.

Further, the apparatus also comprises means for drawing from sump 37 a certain amount of liquid, bringing it to basket 36, and causing it to descend through and on the mass of solid polymer therein contained until it returns to said sump carrying therewith new liquid formed in the further melting. Said motion of the liquid occurs preferably in a continuous manner, that is, one has a circulating stream of liquid polymer. Said means, in the embodiment illustrated, comprise an intake 44 through which a circulation pump 45 draws liquid polymer from the sump, and a pipe line 46 fed by pump 45 ending within the mass of solid polymer or above the portion thereof contained in the basket 36. Along the pipe line 46 there are preferably located means for raising the temperature of the circulating liquid in order to impart thereto a thermal content such that it may effectively contribute to the further melting that occurs in the basket, such as for instance the electric resistances 47 schematically illustrated.

Said temperature must be such that the liquid return to the sump at the predetermined temperature that it should maintain therein, after having caused a predetermined amount of solid to melt.

Everything that has been said with respect to Fig. 1 about the operation of the apparatus, the starting thereof, and the means and ways of controlling the temperatures and the melting rates, is just as true of the embodiment of Fig. 2. The effect of the circulating liquid stream is superimposed to the effect of the liquid originating from the first melting. By raising the temperature of the circulating liquid, effects similar to those achieved by raising the temperature of the first-melting liquid are produced. In the case of the circulating liquid however the amount and the temperature thereof are wholly independent and are directly and separately controllable, and this is one of the main advantages of this species of the invention.

It is evident that the means for bringing about the desired motion of part of the liquid contained in the collecting sump, may vary as all the details of the various embodiments of the invention may be modified. For instance the sump may have a single outlet and the circulation pump may deliver part of the liquid to the basket and part to the spinning; the delivery or the temperature of the circulating liquid or both may be automatically controlled by the level of the liquid in the sump; the motion of the liquid need not necessarily be continuous; and so forth.

We claim:

1. A process for the melting of synthetic linear high polymers, comprising the steps of continuously feeding solid particles of the polymer to the top of a melting chamber, allowing the same to progress downwards by gravity through said melting chamber, melting a part of said particles by transmitting heat thereto from solid heating surfaces located in said melting chamber, positively retaining in an intermediate portion of said melting chamber below said solid heating surfaces the particles that have not been so melted, causing the liquid polymer originating from the particles that have been so melted to wash the unmelted particles retained in the intermediate portion of said melting chamber whereby to melt a further amount of polymer, and allowing all of the molten polymer to escape from said intermediate portion of the melting chamber and to collect in a reservoir located in the lowermost portion of said melting chamber.

2. A process according to claim 1, comprising maintaining the level of the liquid polymer in the reservoir located at the lowermost portion of the melting chamber, high enough partially to cover the unmelted polymer particles retained in the intermediate portion of the melting chamber.

3. In a process for the melting spinning of high polymers, the steps of continuously melting the polymer according to claim 1, of continuously drawing the molten polymer from the reservoir located in the lowermost portion of the melting chamber and of continuously delivering it to spinning posts at a predetermined rate equal on the average to the rate at which the solid polymer particles are fed to the melting chamber.

4. A process for the melting of synthetic linear high polymers, comprising the steps of continuously feeding solid particles of the polymer to the top of a melting chamber, allowing the same to progress downward by gravity through said melting chamber, melting a part of said particles by transmitting heat thereto from solid heating surfaces located in said melting chamber, positively retaining in an intermediate portion of said melting chamber below said heating surfaces the particles which have not been so melted, causing the liquid polymer originating from the particles which have been so melted to wash the unmelted particles retained in the intermediate portion of said melting chamber, whereby to melt a further amount of polymer, allowing all of the molten polymer to escape from said intermediate portion of the melting chamber and to collect in a reservoir located in the lowermost portion of said melting chamber continuously drawing the molten polymer from said reservoir, and continuously delivering it to spinning posts, while continuously recirculating a portion of the molten polymer contained in the reservoir to said intermediate portion of said melting chamber, and causing said recirculated portion to wash the solid particles not melted by contact with the heating surfaces and retained within the melting chamber.

5. Melting apparatus for synthetic linear high polymers, comprising a melting vessel, means for feeding solid polymer particles thereto, heating surfaces in the upper portion of said melting vessel, means for passing a first portion of said particles onto said surfaces to melt the same, said first portion being substantially less than the whole, said surfaces being shaped to permit the downwardly progress of solid and molten polymer and to convey the same to a discharge opening provided in said surfaces a container positioned below said discharge opening and being open to receive said solid and molten polymer and having the walls so apertured as to substantially retain the solid while allowing the liquid to escape, said container being suspended in the melting vessel, a reservoir at the bottom of the said melting vessel wherein the molten polymer collects, means for drawing molten polymer from the reservoir and delivering it to a position from which it can wash the solid particles retained by the container in the melting vessel.

6. Apparatus according to claim 5 wherein the means for drawing comprises a circulation pump, an intake pipe line which puts the intake of said pump into communication with the liquid reservoir in the melting vessel, and a delivery pipe line connected to the outlet of said pump and terminating with an opening substantially overhanging the part of the solid polymer mass that is contained in the container provided therefor in the melting vessel, the liquid outflowing from said last mentioned pipe line returning thereafter by gravity to said reservoir after having washed the solid contained in said container.

7. Apparatus according to claim 5, comprising means for heating the molten polymer drawn from the reservoir before it washes the solid polymer.

8. Melting apparatus for synthetic linear high polymers, comprising a melting vessel, means for feeding solid polymer particles thereto, heating surfaces in the upper portion of said melting vessel, means for passing a first portion of said particles onto said surfaces to melt the same, said first portion being substantially less than the whole, said surfaces being shaped to permit the downwardly progress of solid and molten polymer and to convey the same to a discharge opening provided in said surfaces, a container positioned below said discharge opening and being open to receive said solid and molten polymer and having the walls so apertured as to substantially retain the solid while allowing the liquid to escape, said container being suspended in the melting vessel, a reservoir at the bottom of said melting vessel wherein the molten polymer collects, said reservoir being provided with an outlet branching into two branch lines, the first of which leads part of the molten polymer to the container suspended in the melting vessel and the second of which leads another part of the molten polymer to spinning posts.

9. A process for the melting of synthetic linear high polymers, comprising the steps of continuously feeding solid particles of the polymer to the top of a melting chamber, allowing the same to progress downwards by gravity through said melting chamber, melting a part of said particles by transmitting heat thereto from solid heating surfaces located in said melting chamber, positively retaining in an intermediate portion of said melting chamber below said solid heating surfaces the particles which have not been so melted, causing the liquid polymer originated from the particles that have been so melted to wash the unmelted particles retained in the intermediate portion of said melting chamber to melt a further amount of polymer, allowing all of the molten polymer to escape from said intermediate portion of the melting chamber and to collect in a reservoir located in the lowermost portion of said melting chamber, and drawing an amount of molten polymer from the said reservoir and conveying it to said intermediate portion of said melting chamber to cause it to wash the unmelted polymer particles retained therein, whereby to melt a further amount of polymer.

10. In the process of claim 9 the steps of heating the amount of molten polymer drawn from the reservoir before delivering it to the intermediate portion of the melting chamber.

References Cited in the file of this patent
UNITED STATES PATENTS

| | | |
|---|---|---|
| 1,747,552 | Lund | Feb. 18, 1930 |
| 1,807,054 | Wadman | May 26, 1931 |
| 1,834,631 | Mulholland | Dec. 1, 1931 |
| 2,253,176 | Graves | Aug. 19, 1941 |
| 2,278,875 | Graves | Apr. 7, 1942 |
| 2,280,706 | Jones | Apr. 21, 1942 |
| 2,371,213 | Batchell | Mar. 13, 1945 |
| 2,382,723 | Kersebon | Aug. 14, 1945 |
| 2,404,406 | Roddy | July 23, 1946 |